May 19, 1970 C. R. GOOD 3,512,924
THERMOMETER HOLDER
Filed Jan. 26, 1968 2 Sheets-Sheet 2
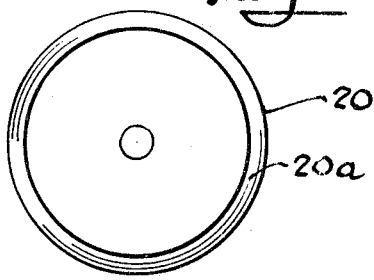
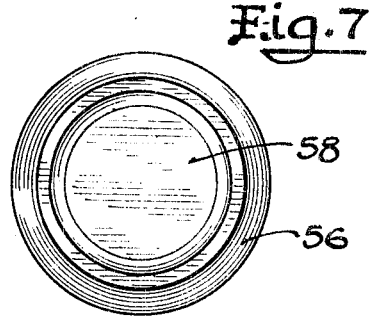
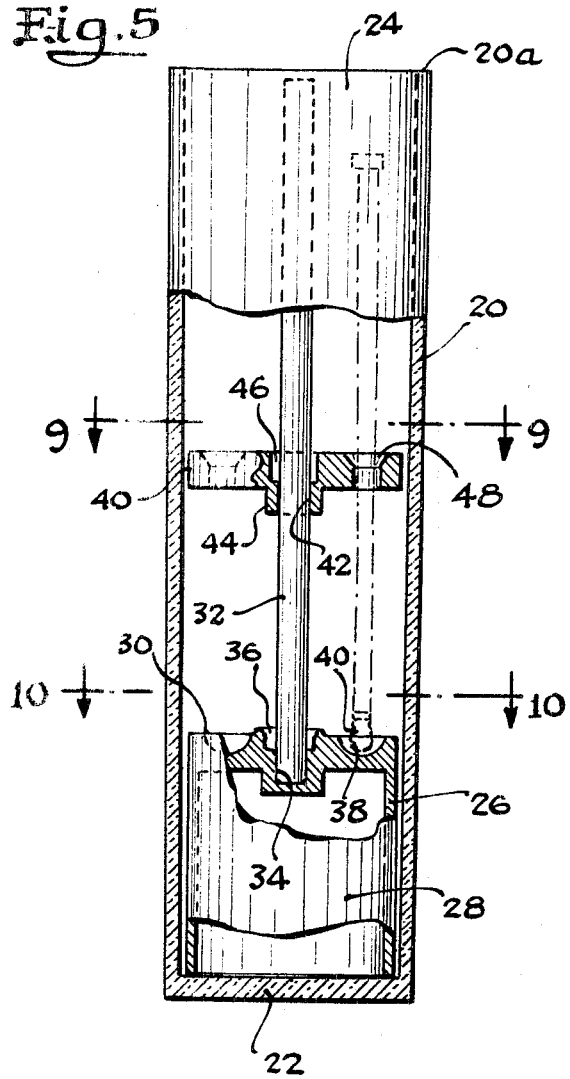
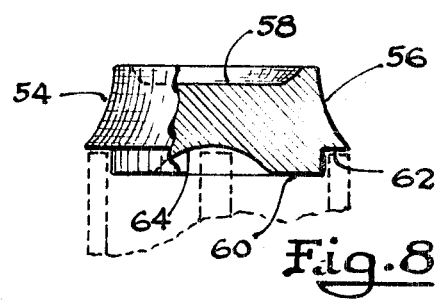
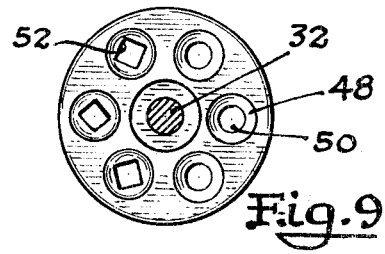
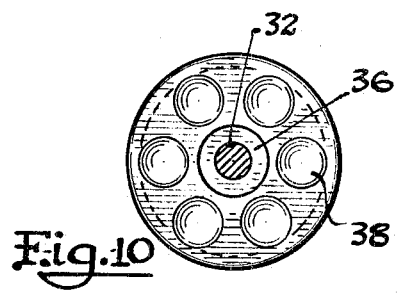
Inventor
CARLETON R. GOOD
By Burmeister, Kulie, Southard & Godula
Attorneys

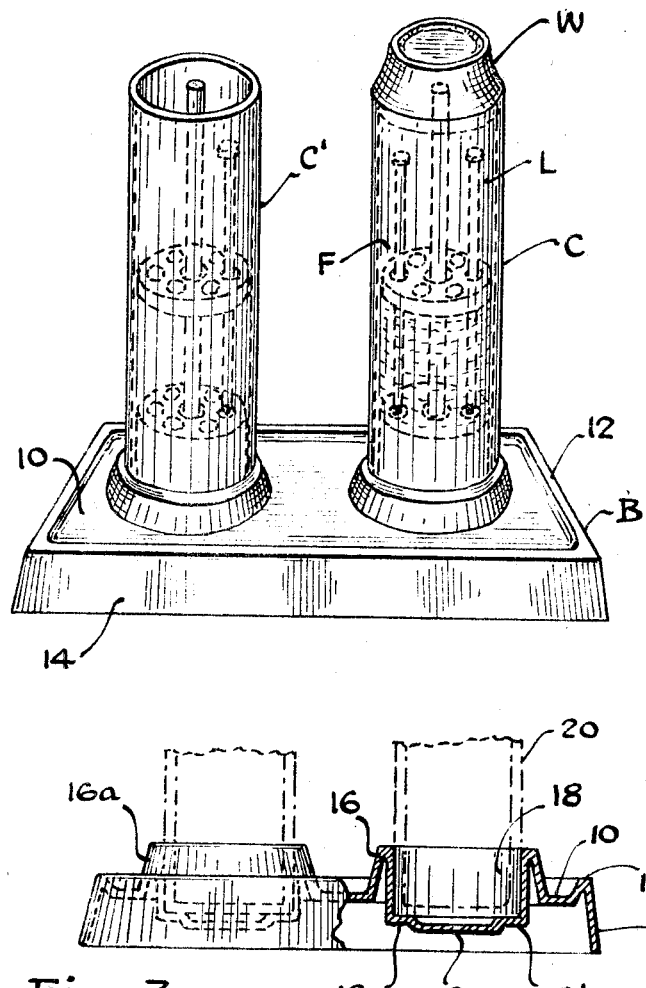
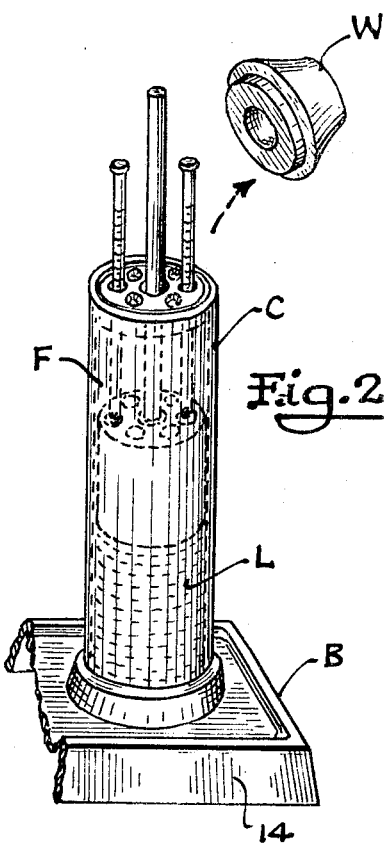
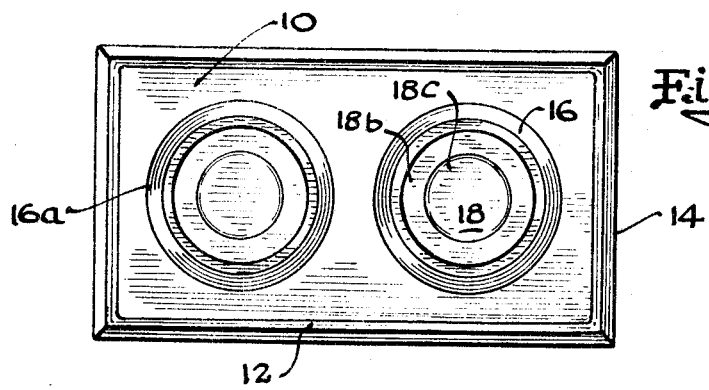

United States Patent Office 3,512,924
Patented May 19, 1970

3,512,924
THERMOMETER HOLDER
Carleton R. Good, 341 Factory Road,
Addison, Ill. 60101
Filed Jan. 26, 1968, Ser. No. 700,767
Int. Cl. A61l 3/00; B65d 81/22, 85/20
U.S. Cl. 21—87                                        10 Claims

ABSTRACT OF THE DISCLOSURE

A thermometer holder in which a container having an open top is adapted to hold a sterilizing or antiseptic liquid, and in which a float is placed to hold a plurality of thermometers or the like so that the thermometers may be accessible when the float rises in the liquid. The float is made of a material having a specific gravity lower than the specific gravity of the sterilizing or antiseptic liquid selected for inclusion in the container. The float has support portions on which the bulbs of a plurality of thermometers are seated, and in which the thermometers are held upright. A stem on the float extends to the top of the containers, where it may be restrained from upward travel by hold-down means at the open top of the container. Two containers may be removably seated in sockets on a base member, and thermometers may be withdrawn from the first container for use, and then deposited in the second container following such use for a time sufficient to attain desired sterilization.

---

This invention relates to an apparatus for holding thermometers and for delivering thermometers to an accessible position. The invention particularly relates to an apparatus adapted to hold thermometers in an antiseptic medium and to deliver the thermometers for withdrawal and use, as well as return to the same or like apparatus for reconditioning by immersion in the antiseptic medium.

Places such as nursing homes, hospitals, offices of physicians and the like, use a small number of thermometers to measure the body temperatures of a number of humans in excess of the number of thermometers usually kept on hand. Sound medical technique requires that a thermometer be conditioned or treated in a sterilizing or antiseptic medium following such use. In general, containers of various sorts have been used which contain such a conditioning medium, and in which one or more of the thermometers are deposited for immersion.

Containers as such have not been uniformly accepted as advantageous embodiments because there is some inconvenience associated with depositing and withdrawing the thermometers from such containers, which are usually provided with an open top. Since it is desirable that a substantial portion of the body of the thermometer member be immersed in the conditioning medium, only a small portion of such thermometer bodies project out of the containers. This contributes to the difficulty in handling the thermometers, as by trying to withdraw them for subsequent use. Not only are the extending portions inconvenient for handling, but such thermometers generally are in random contact with one another as by criss-crossing or the like. This additionally makes it difficult to easily remove the thermometers from the containers, and it has been known that such thermometers are on too many occasions broken.

Another problem has been the uncertainty which is present relative to adequate conditioning or immersion of the thermometers in the sterilizing or antiseptic mediums. Busy practitioners do not take time to individually label the thermometers so they often do not know how long a particular thermometer has been immersed in the conditioning medium.

In consequence of the foregoing considerations, the art would readily welcome new thermometer-holding apparatuses and combinations which would allow thermometers to be deposited and withdrawn from containers with sterilizing mediums in an improved way to facilitate such operations and to markedly reduce the likelihood of breakage. Also, the art would readily welcome new apparatus and combinations which would lead to better handling of thermometers relative to use and reconditioning in a sterilizing or antiseptic medium before reuse.

It is accordingly one important object of the present invention to provide an apparatus for holding thermometers in a conditioning medium, and for delivering such thermometers for easy accessibility and withdrawal in an improved manner.

Yet another important object of the invention is to provide an apparatus which markedly reduces the likelihood of breakage of the thermometers, and which additionally provides the advantageous features of a rack to separately and neatly hold a plurality of thermometers.

Still another important object of the invention is to provide a thermometer-holding apparatus, of the foregoing type, in combination with a supporting member designed to realize conveniences and stability.

A still other important object of this invention is to provide thermometer holders of the foregoing type, in which two or more thermometer holders are securely and conveniently positioned on a base member so that a plurality of such containers may be used in sequence to transfer thermometers from a storage container to a reconditioning container following a use thereof in taking temperatures. It is a feature of this object that thermometers may be transferred to another container in an orderly and controlled manner to assure a sufficient immersion time of the used thermometer in a conditioning medium before such thermometer is reused.

Objects such as the foregoing are attained by the invention of the following disclosure which includes drawings wherein:

FIG. 1 is a perspective view of one embodiment showing a pair of thermometer-holding apparatuses;

FIG. 2 is a view similar to FIG. 1, but showing a broken away portion to illustrate one thermometer holder with the cap in removed position;

FIG. 3 is a side elevational view, partly in section and showing portions of the container in phantom, of a base member used in conjunction with an apparatus-holder;

FIG. 4 is a top plan view of the base member of FIG. 3;

FIG. 5 is a side elevation, on an enlarged scale, and partly in section, of a container and float in the holder;

FIG. 6 is a top plan view of the container and float of FIG. 5;

FIG. 7 is a top plan view of a weighted hold-down cap;

FIG. 8 is a side elevational view, partly in section, of the hold-down cap of FIG. 7, with portions of the container shown in phantom;

FIG. 9 is a view along line 9—9 of FIG. 5; and

FIG. 10 is a view along line 10—10 of FIG. 5.

The use of the same numerals in the various views will indicate a reference to the same structures or parts, as the case may be.

The view of FIG. 1 shows one preferred embodiment of an apparatus holder assembly for thermometers or the like. In this view a base member B holds a pair of containers C, C' which are removably positioned on the base B. Each container has a float shown generally as F, and the container is adapted to hold a conditioning medium which may be a sterilizing or antiseptic liquid L. The top of the container has hold-down means shown as a weighted cap W.

As indicated in FIG. 2, the float F is buoyed by the higher specific gravity of the liquid L when the hold-down means W is removed from the top of the container C. The float is formed of a material which has a lower specific gravity than the liquid L.

The base member is shown in the form of a tray which has a planar support surface 10 which is bordered by a peripheral ridge 12, and such ridge extends into a continuous depending skirt 14, the bottom edge whereof is adapted to make supporting contact with a table or the like. It is convenient to form the base member from molded plastic such as substantially rigid and high density polyethylene. Looking at the partial sectional view in FIG. 3, it is seen that the molded member has various top side and underside conformations which are complementary in the sense that recessions formed at the top side take the form projections on the underside and vice versa. The planar top side is modified to form a pair of bosses 16 and 16a which are of similar structure. Boss 16 has a socket 18 which is formed by a continuous side wall 18a and a substantially flat bottom wall 18b.

The floor 18b has a lowered portion 18c which reduces the total contact surface between the bottom of the socket and the bottom of the container C. The conformations and dimensions of the socket 18 are matched with the conformations and dimensions of the container C so that said container may be inserted and positioned, and withdrawn in a facile manner. In the illustrated embodiment, the container is preferably shaped as a substantially cylindrical casing and the socket is likewise substantially circular. The outside diameter formed by the continuous wall 20 of the container is accordingly less than the inside of the diameter of the socket formed by the side wall 18a.

Reference may now be made to FIGS. 5–10 for greater details of the container and float. The container is shown as an elongated casing having a continuous arcuate side wall 20, a bottom planar wall 22 and an open top 24 which is opposite the end where the planar bottom wall is located. The top 24 is defined by a continuous top edge 20a of wall 20. Such a container may likewise be formed of substantially rigid plastics such as the acrylics which can be formed as transparent materials.

The float is shown as having a hollow piston 26 at the lower portion which is adapted to contact the bottom wall 22 of the container. The piston is formed by continuous arcuate wall 28 which depends in normal relation from a top wall 30 which lies in a plane substantially normal to the longitudinal axis of the container and to the longitudinal axis of an elongated member or stem 32. The end of the stem 32 is shown fixed in a centrally positioned socket 34 in top wall 30 of the piston. The end of the stem may be press fitted in a lower part of the socket which has a diameter to receive the diameter of the circular stem in frictional fit, and a bonding material such as 36 may be introduced in an enlarged under portion of the socket.

The top wall of the piston is provided with a plurality of wells, one of which is shown at 38. Such wells are used to seat bulb 40 of a thermometer. A plurality of such wells are preferably radially spaced at substantially equal distances in the top wall 30 as illustrated in FIG. 10.

Spaced from the lower portion of the float is a support plate 40 which is shown as having a disc-shape, and which lies in a plane normal to the longitudinal axis of the container and the stem 32. The plate is shown with a central passageway 42 which extends below the plate 40 as defined by depending hub 44. The support plate is fixed to the stem by various means which may include unitary molding of the stem and the support plate, or use of a bonding agent in an enlarged portion 46 of the passageway or by other means. The support plate has a plurality of passageways, each passageway being aligned with an underlying well in the top wall 30 of the hollow piston. Each of the passageways is shown as having an upper taper 48 to facilitate entry of the bulb of the thermometer, and an underlying straight wall passageway which may be circular as at 50 or have a polygonal shape as at 52. The polygonal or square shape which is shown is more conveniently used with thermometers whose body sections have polygonal cross sections, and the circular shape is more conveniently used with thermometers whose bodies have substantially circular cross sections.

The support plate is positioned intermediate the bottom of the stem which is bonded to the hollow piston and the top of the stem which terminates short of the top opening 24 of the container. The top of the stem, or upper portion of the float, does not substantially extend above the top edge 20a of the container, which is an advantage because of the hold-down means which will contact the upper portion of the float and hold it within the container. Such a hold-down means is shown as a weighted cap which may be a unitary body member 54 made of aluminum or the like.

The body member 54 is shown as having a continuous upwardly tapered side wall 56, a top 58 which is shown recessed, and a bottom 60 which is inset from the tapered side walls to form a continuous shoulder at 62. The shoulder 62 is seated on edge 20a to securely position the cap and close the top 24 of the container. The bottom wall 60 is shown as having a centrally positioned cavity 64 which can accommodate the top of the stem when the cap is fully seated along the top edge 22a of the container. It will be appreciated that by increasing the depth of the cavity 64 toward the top wall 58, even greater accommodation for longer stems may be effected. In general, however, it is preferred that the top portion of the float not extend substantially above the top opening of the container.

In operation, it is preferred to make the float out of material which has a specific gravity less than that of ordinary tap water since this liquid is commonly used in the conditioning medium which is placed into containers of this type. Generally, small amounts of antiseptic or sterilizing solutions are added to ordinary tap water to attain the conditioning medium within the container, but various sterilizing and antiseptic mediums which are commonly used in the art may be employed. In any event, the addition of these sterilizing or antiseptic materials does not substantially alter the specific gravity of ordinary tap water so as to interfere with the buoyancy of the float when the hold-down means are removed from the top of the container.

If a single apparatus holder is employed, the float will rise when the hold-down means is removed, until substantial portions of the thermometer bodies project above the top of the container as indicated in FIG. 2. The thermometer can then be conveniently and easily withdrawn from the aligned passageway in the support plate and from the well in the top wall 30 of the hollow piston. Such aligned well and passageway separate each thermometer from other thermometers so as to markedly reduce the likelihood transfer of contamination or of breakage upon withdrawal or deposit of a thermometer. After the thermometer is used it can be returned to the same container by placing it in an aligned passageway and well which is somehow identified to indicate that the used thermometer must be again conditioned in the conditioning medium. When using a single container, such identifying means may be the polyganol-shaped passageway such as 52. Also, the top of the support plate could have indicia on the surface thereof for this purpose.

A preferred embodiment is the combination indicated in FIG. 1. In practice, the thermometer can be withdrawn from container C for use and deposited in container C' following such use. Although not illustrated, the container C' is usually under these conditions partially filled with antiseptic liquid L and used with the cap W to sterilize the thermometers for a maximum period, and the float F in the container C is permitted to elevate the thermometers partially above the container, as shown in FIG. 2. Recommended medical technique requires that the used thermometer be immersed in the conditioning medium for a certain minimum period. After the last thermometer in container C has been used and deposited in container C', the first thermometer to be withdrawn from container C' can be the one first deposited therein. Again, use may be made of adequate identifying indicia on the surface of the support plate or even on the side wall of the casing. The recommended minimum immersion time will in most cases easily transpire while the practitioner withdraws the thermometers by following the reverse sequence of deposit. If the practitioner does not wish to follow any particular sequence, he may just permit the required minimum period to transpire before using thermometers in a container.

The invention may now be practiced in the many various ways which occur to those skilled in this art, and all such modifications in practice will comprise a part of the concept behind the disclosed embodiments. The invention is now defined by the terms of the following claims which are given further meaning by the language of the preceding description.

What is claimed is:

1. A holder for a thermometer or the like, which includes
 a container having a continuous side wall, a bottom support so that said container may be positioned upright, and a top opening, said container being adapted to retain a body of conditioning liquid within said container,
 a float translatively disposed relative to the top opening in said container, said float having a specific gravity less than that of the conditioning liquid,
 said float having supports to hold a thermometer or the like, confronting the opening, said supports permitting translation of the thermometer in the direction of the opening, and
 releasable means to hold down the float in the float in the container.

2. A holder as in claim 1 wherein the side wall of the container is substantially circular, and
 the float includes a lower portion having a continuous circular wall with an outside diameter slightly less than the inside diameter of the container, said lower portion being bottomed in the container when said upper portion extends to about said top opening.

3. A holder as in claim 1 in which the container is elongated and the continuous side wall is substantially circular,
 the bottom support of said container is a flat end wall, the opening is circular and said opening is at the end of the container opposite the flat end wall,
 the float includes a lower portion in the configuration of a substantially circular and hollow piston, and
 the float having an upper portion of the float is an extension of an elongated member extending from the top of the piston.

4. A holder as in claim 3 wherein the hold-down means is a weighted cap to close the top opening and contact the top of the elongated member.

5. A holder as in claim 3 in which said hollow piston has a top wall lying in a plane which is normal to the longitudinal axis of the container,
 said continuous wall of the piston is a continuous depending skirt which is in normal relation to the plane of the top piston wall, and
 the top of said piston wall has a plurality of spaced wells to receive the bulbs of a plurality of thermometers.

6. A holder as in claim 5 in which the elongated member is fixed to the top wall of said piston and extends to just below the top opening of the container when the bottom of the depending skirt contacts the bottom end wall of said container,
 a support plate is fixed to the elongated member in spaced relationship to the top wall of said piston, said support plate lying in a plane substantially normal to the longitudinal axes of said container, and
 said support plate having a plurality of passageways, each of said passageways being aligned with a well in said top wall of said piston so that a passageway in the support plate may hold the body of the elongated thermometer body when the bulb is seated in the well aligned with said passageway.

7. A holder as in claim 1 which further includes, in combination,
 a base, said base member having a top wall,
 a socket in said wall, and
 said socket adapted to removably receive and position the bottom of said container.

8. A holder in combination with a base member as in claim 7 in which
 said container is shaped as an elongated cylinder having a flat bottom wall and an opening opposite said bottom wall, and
 said socket having a substantially circular configuration with an inside diameter slightly in excess of the outside diameter of said container so that the container may be easily seated and positioned in the socket and withdrawn from said socket.

9. A holder and base member combination as in claim 8 which further includes
 a second container shaped as an elongated cylinder with a flat bottom wall and an open top opposite said bottom flat wall,
 a second socket in the top wall of said base member, said second socket having a substantially circular configuration with an inside diameter slightly in excess of the outside diameter of said second container so that said second container may likewise be easily seated and withdrawn from said second socket,
 a second float in said second container, and
 each of said first and second containers having weighted hold-down caps adapted to close the open tops of said containers and to hold down the upper portion of the floats in said containers when said liquid is placed in said first and second containers.

10. A holder and base member combination as in claim 9 in which
 the float in each of said containers includes a bottom portion in the shape of a hollow circular piston, a top wall of said piston lying in a plane substantially normal to the longitudinal axis of the container,
 an elongated member or stem fixed to the top piston wall and extending so that it terminates just short of the open top of the container when the piston is bottomed against the flat bottom wall of said container,
 a plurality of equally spaced wells in the top piston wall,
 a support plate fixed to the stem in spaced relation to the hollow piston, said support plate lying in a plane substantially normal to the longitudinal axis of the stem,
 a plurality of passageways in said support plate, each of said passageways aligned with a well in the top piston wall, whereby the elongated body of a thermometer is supported in the passageway when the bulb of said thermometer is seated in a well aligned with that passageway,
 said weighted cap having a continuous peripheral inset to provide a shoulder to allow the cap to be securely seated on the top end of the container, and a cavity in the bottom of the weighted cap to receive the top of the stem when the cap is positioned at the open end of the container to thereby hold the float within the container and within the liquid in said container.

References Cited

UNITED STATES PATENTS

| | | | |
|---|---|---|---|
| 1,187,364 | 6/1916 | Monnot | 21—105 XR |
| 1,676,090 | 7/1928 | Johnson | 21—87 |
| 1,971,570 | 8/1934 | Lukens | 21—87 |
| 3,236,588 | 2/1966 | Emerson | 21—87 |
| 3,317,274 | 4/1967 | McCormick | 21—90 XR |

MORRIS O. WOLK, Primary Examiner

D. G. MILLMAN, Assistant Examiner

U.S. Cl. X.R.

21—105; 206—16.6; 220—87

UNITED STATES PATENT OFFICE
CERTIFICATE OF CORRECTION

Patent No. 3,512,924　　　　　　　　Dated May 19, 1970

Inventor(s)　Carleton R. Good

It is certified that error appears in the above-identified patent and that said Letters Patent are hereby corrected as shown below:

Column 5, line 61, after "portion" cancel "of the float" and insert -- which --.

Signed and sealed this 1st day of December 1970.

(SEAL)
Attest:

EDWARD M. FLETCHER, JR.　　　　　　WILLIAM E. SCHUYLER, JR.
Attesting Officer　　　　　　　　　　Commissioner of Patents